Oct. 8, 1946.  E. L. SCHELLENS ET AL  2,409,155
RADIO TRANSMISSION APPARATUS
Filed Sept. 4, 1942  3 Sheets-Sheet 1
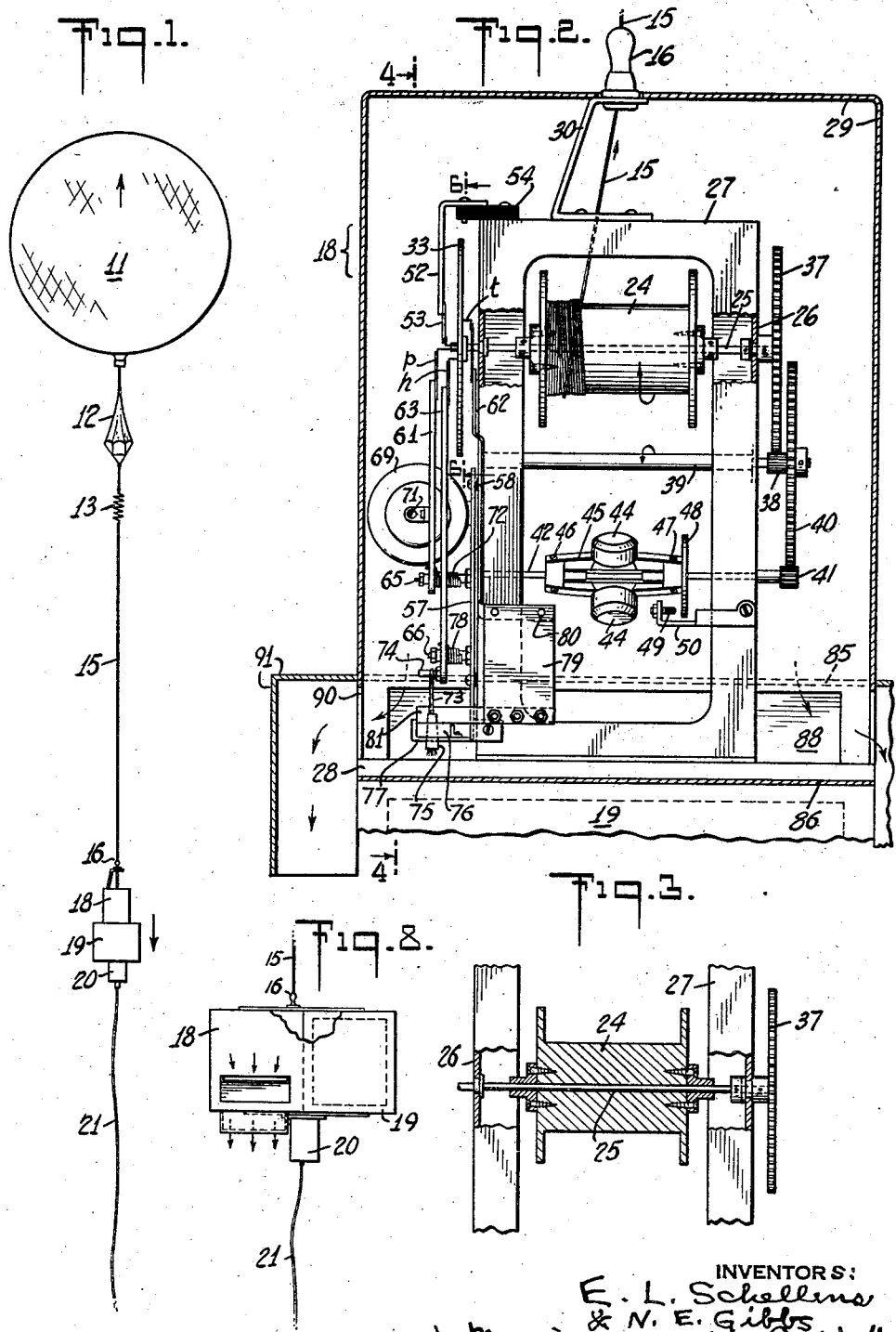
INVENTORS:
E. L. Schellens
& N. E. Gibbs
by Morrison, Kennedy & Campbell
ATTORNEYS.

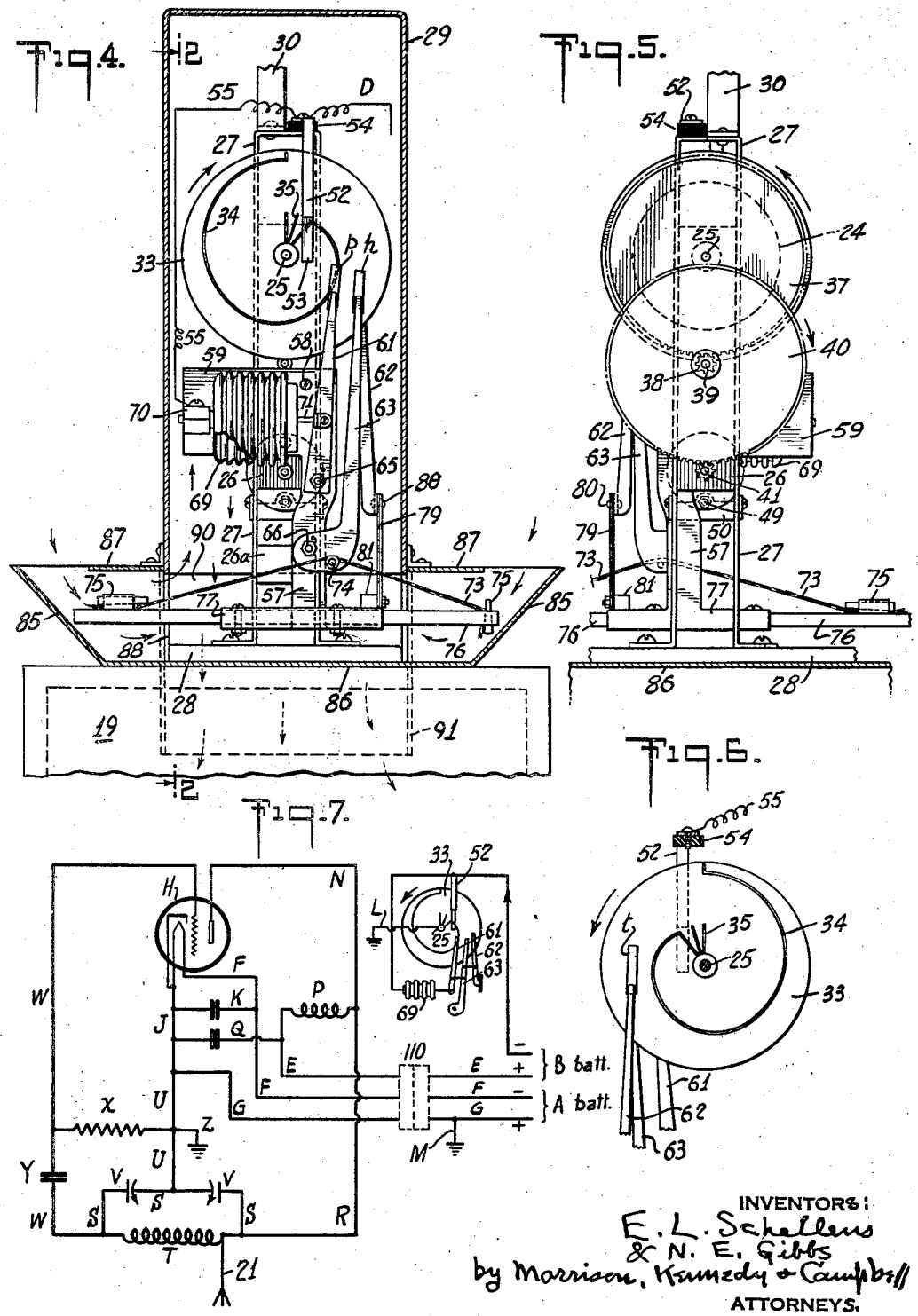

Oct. 8, 1946.                E. L. SCHELLENS ET AL                2,409,155
                           RADIO TRANSMISSION APPARATUS
                             Filed Sept. 4, 1942            3 Sheets-Sheet 3

INVENTORS:
E. L. Schellens
& N. E. Gibbs
by Morrison, Kennedy + Campbell
ATTORNEYS.

Patented Oct. 8, 1946

2,409,155

UNITED STATES PATENT OFFICE 2,409,155

RADIO TRANSMISSION APPARATUS

Eugene L. Schellens, Essex, and Norman E. Gibbs, Old Lyme, Conn., assignors to The R. W. Cramer Company, Incorporated, Centerbrook, Conn., a corporation of Connecticut Application September 4, 1942, Serial No. 457,268

6 Claims. (Cl. 177—380)

This invention is a novel radio transmission apparatus, for the sending of signals or intelligence; and in one of its principal uses relates particularly to the transmitting of signals or data from free or captive balloons. A typical instance is the sending from the balloon to a ground station of information on one or more of the weather factors, the pressure and the temperature of the atmosphere and its relative humidity; and in this aspect the invention is a radiometeorograph, or apparatus to be carried by a sounding balloon, radio equipped, from which such apparatus has come to be known as radiosonde. Certain features of the invention however are applicable to balloon use for other than weather communication purposes, or even for other kinds of transmitting utility.

In its illustrated form the present invention embodies certain of the general principles utilized in the well known Olland meteorograph, as explained for example in National Bureau of Standards research paper RP-1169 contained in volume 22 of the Journal of Research of that bureau in the issue of January 1939 and referring to developments and tests made in earlier years. According to the terminology in said publication the Olland radiometeorograph is composed basically of several cooperating means or pieces of apparatus, including (1) the radio transmitter, with its antenna, (2) the source of current or battery therefor and (3) the driven signal-producing mechanism, referred to as a radio telemeter. The third or telemeter mechanism includes the instruments which are sensitive respectively to the pressure, the temperature and the humidity of the atmosphere, the operating means by which the responses of these instruments to the existing conditions are translated into signals, of dot and dash and other kind, for transmitting by the radio means from the balloon to the ground, and the drive or actuating means therefor.

The general objects of the present invention are to afford a radio transmission apparatus, more particularly adapted for signal transmission from balloons, which will be more simple and rugged of construction, more convenient and accurate in setting and using, and more efficient and reliable in its transmitting functions. A particular object is to provide an improved signal producing or telemeter mechanism, and the actuating means or drive therefor; and another object is to provide a meteorograph in which certain of the elements are protectively housed while the sensitive instruments, particularly the thermostatic and humidostatic devices, are continuously exposed to the influence of the surrounding atmosphere. A further object is to provide a reliable and efficient source of drive for the telemeter mechanism, dispensing with the need of springs or analogous stored energy, and dispensing also with drawing current from batteries for actuating the mechanical part of the apparatus. A special object is to provide a radio transmission apparatus for the recited or analogous uses wherein the need of electric batteries may be dispensed with, both for the energizing of the transmitter circuit and for the driving of the telemeter mechanism.

Further advantages of the invention will be explained in the hereinafter following disclosure of illustrative embodiments thereof or will be understood by those conversant with the subject. To the attainment of the recited objects and advantages the present invention consists in the novel radio transmission apparatus, or radiosonde, and the novel features of operation, combination, arrangement and construction herein illustrated or described.

In the accompanying drawings Fig. 1 is a general elevation view of a complete radiosonde apparatus embodying the present invention, as it appears during ascent and operation.

Fig. 2 is a right elevation view of the telemeter unit and mechanism, partly in section on the vertical line 2—2 of Fig. 4 and showing portions of the battery box and ventilating system. Fig. 3 is a detail section view, taken centrally through the cord drum or spool, looking from the right.

Fig. 4 is a front elevation view of the telemeter mechanism, its housing being seen in section on the line 4—4 of Fig. 2. Fig. 5 is a rear elevation view of the telemeter mechanism, with housing and other parts omitted. Fig. 6 is a rear elevation view of certain parts, seen partly in section on the vertical line 6—6 of Fig. 2.

Fig. 7 is an illustrative wiring diagram suitable for the radio signalling or transmitting purposes hereof.

Fig. 8 is a general view like Fig. 1 showing a modification in the several units of apparatus and their relative arrangement.

Figure 9:
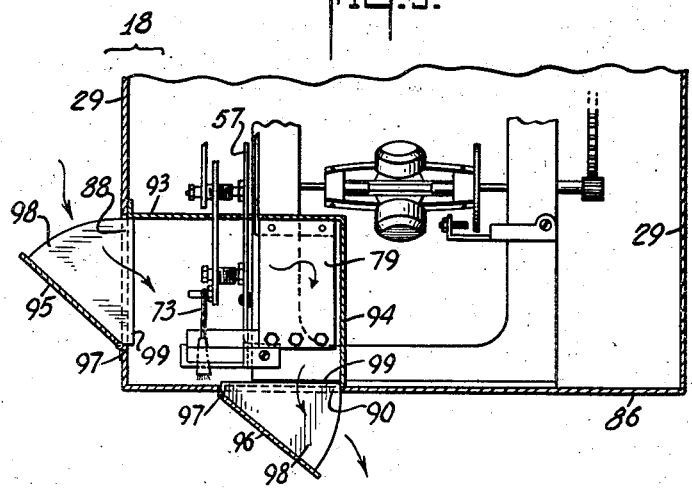

Fig. 9 in right elevation, similar to Fig. 2, shows a part of the telemeter mechanism in modified construction, corresponding with Fig. 8.

Figure 10:
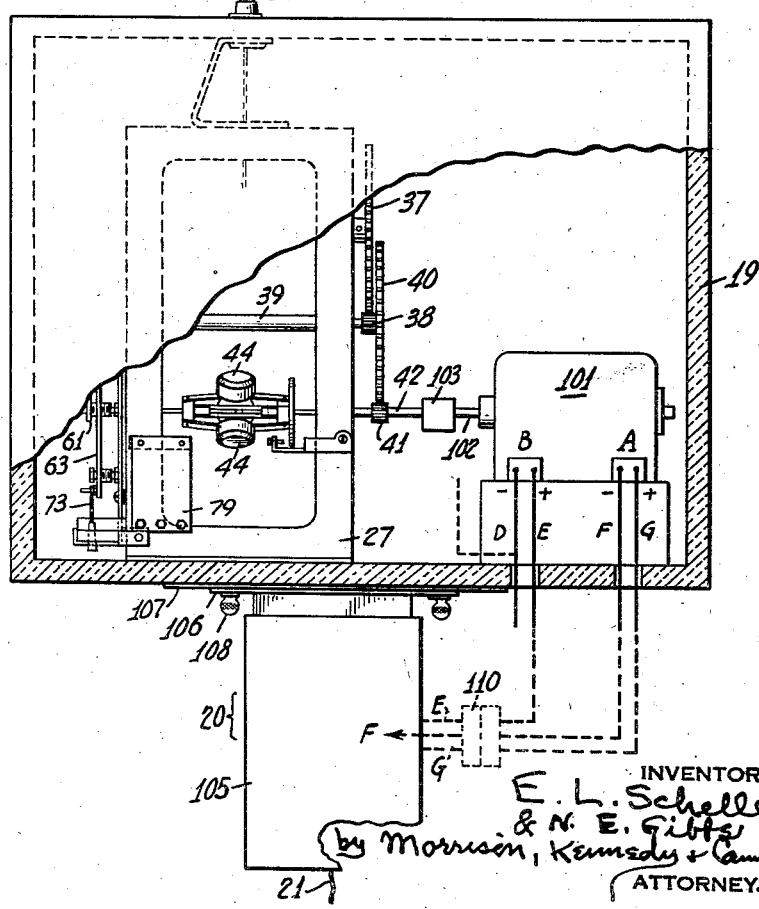

Fig. 10 in right elevation, partly broken away, shows a modification of apparatus dispensing with the need of a battery.

Referring first to the general diagram of Fig. 1, the apparatus in operation comprises at the top the rising balloon 11 below which is hung a parachute 12 from which in turn the apparatus hereof is suspended. Known means may be used to detach the parachute at a predetermined altitude or time for the safe return of the apparatus to the ground. A cushion means in the form of a stretchible spring 13 is next shown, being desirable to minimize jerky movements of the telemeter unit. Below the parachute and cushion extends the suspension cord or wire 15 which may preferably be composed of a well known marketed fiber known as nylon or other strong and flexible braided fiber, this element taking part in the operations to be described. This suspension cord 15 is shown as passing through a top guide 16 leading into the interior of the telemeter means or unit 18, indicated as contained in a housing and to be later described. Adjacent to this unit is the source of current 19, as a battery unit, contained in a box. Below these is the transmitter or signalling means 20 contained in a detachable case; and depending from this case is the antenna 21, of suitable length for the signalling purposes, and connected with the transmitter circuits.

According to the preferred embodiment, the telemeter dial or disk is driven not by the energy of a spring or a battery but by the descent of the suspended apparatus, relatively to the ascending balloon, thus, through the cord 15 applying gravity to actuate the disk or rotor. A long extent of cord is wound on a spool 24 fast on a drive shaft 25, rotating in the end walls 26 of an upright frame 27 standing on a base 28. This base also supports the enclosing housing 29 of the telemeter, within which, upon the interior frame is a top bracket 30 carrying the guide 16, that may be a rubber nursing nipple or the like adapted to allow the cord to flow relatively upward in operation while substantially excluding the downflow of rain or moisture into the telemeter unit.

As with the Olland radiometeorograph the apparatus preferably sends out, in each cycle or rotation of the controlling dial or signalling disk, a series of radio impulses representing the beginning and end of each cycle (as a fraction of a minute), and also the indication of the existing factors, the pressure, temperature and humidity, as the balloon elevates the apparatus, up to ten miles or greater altitude, and while it drifts off over dozens or scores of miles. The sending may be of short wave, as five meters, and the reception may be conventional, the indications being marked on a traveling tape, which may be cut into cycle-lengths and re-arranged to show the progressive changes of the three factors.

The controlling or sending elements of the telemeter is shown as a dial or rotor 33, in the form of a disk, although it might be cylindrical. This rotary dial is shown mounted directly on the shaft or spindle 25 of the spool or drum 24, so that if it be of metal it is grounded to the frame 27, which may be of aluminum. The dial 33 may be of plastic material, or if of metal is coated with an insulating layer. The dial or disk is provided with a contact spiral 34, which may be of wire, inset flush with the face of the disk; and if the dial be cylindrical the spiral will take a helical form. This spiral contact line or tracing extends from near the periphery of the disk, gradually inwardly, crossing the zones over which play the contact arms or levers to be described. The dial is also provided with a plurality of radial contact wires 35, in closely spaced relation to cooperate with a time signal arm or bar to be described. The spiral contact line 34, where it approaches the periphery, may be carried around from face to the back of the disk, and there extended in a corresponding path as is well seen by comparison of Figs. 4 and 6. All contact lines are electrically connected and grounded. Two of the radial wires or contact lines 35 may be time lines representing the beginning and end of each operative cycle of the telemeter; and the disk for example may be driven to make one complete turn or cycle in 15 seconds; each cycle comprising indications of the three measured factors between the cycle ends.

For a steady dial speed the gravity drive of the dial spindle 25 may be governed as follows. The slow turning of the spindle is multiplied by means of a large gear 37 on the spindle meshing with a pinion 38 on a countershaft 39 which carries also a gear 40 meshing with a pinion 41 on a governor shaft 42. The governor may be a centrifugal device, with masses 44 on parallel springs 45 all anchored to a fast collar 46 and a loose collar 47; the loose or sliding collar carrying a brake disk 48 adapted at the desired speed to engage a fixed friction contact 49 adjustably mounted on a bracket 50. When properly set, the gravity drive can turn the gear train at a predetermined speed but no faster, so that a single turn of the dial occurs uniformly in the desired cycle, as fifteen seconds.

Coming now to the control members that cooperate with the steadily rotating dial or disk 33, these include arms and contacts representing respectively the element of time or cycle, and the factors of pressure, temperature and humidity. Thus depending from the top of the frame 27 is a time arm or bar 52, having a contact tip 53 which is adapted to cause reference signals to mark the beginnings and ends of cycles; the extremity of the time contact 53 bearing on the face of the dial in a position or zone to cooperate with the radial lines or contacts 35 of the disk. The time arm 52 may stand in a fixed position while the other arms to be described are each variably movable upon a given zone of the disk, to cooperate with the spiral contact line 34. These four arms are preferably all in the same electric circuit, insulated from the frame and general parts of the mechanism. Thus the time arm 52 is shown as having its bent top end attached to an insulation block 54 which in turn is mounted on the frame top wall, and to connect the arm with the other arms a conductor or wire 55 is shown, its position in the circuit to be later described. There being three radial contact lines 35 the time contact will cause three circuit closings between cycles, these, indicated in the receiving apparatus serving as base or reference marks adapted to be alined, for the successive cycles, so as to give readable positionings to the marks produced by the action of the other arms of the telemeter.

The movable telemeter arms are to have electrically insulated mountings, out of contact with the frame 27, and for this purpose there is provided an insulating panel 57, which may be composed of light metal or aluminum, the same as the frame, and the panel being mounted on the frame as by means of insulated screws 58; the upper part of the panel being shown widened at 59 as a head or extension to receive certain parts to be described.

Upon the panel 57, or other suitable insulated mountings, are arranged the movable pressure arm 61, the temperature arm 62 and the humidity arm 63, these being preferably swingable as the factors change which they represent, their swingings being in planes parallel to the controller dial 23, and their length giving magnification of responsive effect. The contact tips of these three arms, designated p, t and h respectively, are shaped to form fingers that ride on the dial surface, for periodic contact with the spiral line 34, at front or back, thus producing signals varying with the positions of the arms. Thus the pressure arm 61 is shown pivoted by a pin 65 directly on the panel; the humidity arm 63 having a pivot pin 66 thereon; while the temperature arm 62 is differently mounted for its swinging movement as will be described.

The pressure responsive instrument may be of various types but is shown in the form of a bellows capsule or corrugated diaphragm chamber, of conventional kind. This bellows or pressurestat is mounted on the insulated panel extension 59 by a clamp 70 at one end of the bellows, the other end being connected by a rod 71 with an intermediate point of the pressure arm 61. The rod 71 may be a mere pin or spur rigidly extended from the arm toward the bellows end wall, with adjustability, so as to be thrust by the expansion of the bellows, against the resistance of a restoring spring 72, shown as a helical spring under stress mounted on the pivot pin 65 and connected to the pin and the arm respectively.

In order to place the three telemeter arms 61, 62 and 63 in electric communication with the time arm 52, and in the same circuit therewith, the conductor or wire 55 already mentioned is indicated as extending between the time arm and the clamp 70 on the insulated panel, the several arms being thereby metallically connected therewith, through the panel.

The instrument responsive to relative humidity may be of various types but is shown in a form employing as the sensitive element a stretched band or member 73 of hair or skin or other known sensitive materials, as in a conventional hygrometer or humidostat, becoming tighter or shortened with reduction of humidity and vice versa. As a means of applying the pulling and relaxing action of the element 73 to the swinging of the lever 63, the lever is shown as provided with a stud or offset spur or hook 74, over which the band 73 is initially stretched. The band thus takes an angular or bent position, and its two ends are shown anchored by suitable clamp devices 75, for example to the ends of a rigid bar 76, which may be composed of fiber or wood. This band-supporting bar is shown mounted upon the instrument panel 57 by means of a frontward extension 77 of the panel bent partially around the bar 76 and there secured as by two bolts. By this arrangement, the stud 74 being offset rightwardly of the pivot 66 of the humidity arm 63, a reduction of humidity operates to shorten the band and thereby pull downwardly on the stud, thus swinging rightwardly the arm, and shifting its contact tip h rightwardly along the zone of humidity signalling on the dial 33. This movement is opposed by a restoring spring 78, tending lightly to swing the arm 63 leftward, and maintaining the band 73 under light tension; and when increased humidity causes relaxing of the band the spring swings leftwardly the arm in accordance with the degree of humidity. For compactness the restoring spring 78 is provided in the form of a helical spring surrounding the pivot pin 66 of the humidity arm and connected, under strain, with the arm and the pivot pin.

The temperature responsive instrument may also be of various types but is shown in the form of a bimetal strip or plate 79, of substantial width, standing vertically, and attached by screws 80 to a flange formed at the lower end of the temperature arm 62. The lower end of the bimetal plate is similarly connected to a foot or block 81, which in turn is mounted on the frontward extension 77 of the instrument panel 57. The bimetal strip, for example, may have its more expansive layer at its left face, so that with lowering of temperature, as the balloon rises, the strip tends to bend or curve over leftwardly, thus causing a corresponding swinging of the temperature arm 62 leftwardly, in this case at the back side of the disk 33; a rise of temperature of course causing a swinging of the arm in the reverse sense. By this arrangement the temperature tip or contact t, see Fig. 6, is adapted, by cooperation with the back strand of the conducting spiral or line 34 of the disk, to make the necessary contact and circuit-closing in each cycle at a point of time varying with the temperature, so that this factor is thus signalled to the receiving station.

A ventilating system is practically essential, in order continuously to scavenge the air within the telemeter, particularly within the lower part of the housing 29 wherein the thermostat and humidostat are located and depend upon change of air with ascent so as correctly to indicate these factors at each successive altitude. For this purpose, Figs. 2 and 4 show a scavenging system which is illustrative, and involves the use of air scoops 85. These air collecting or intake members are shown at the right and left sides of the telemeter housing, each of them opening upward so as to utilize the relative downflow of the air, which enters the scoops as intakes and passes into the housing, at the opposite sides. These inlet flues or scoops may be formed as inclined extensions of a bottom plate 86 attached below the base plate 28 of the telemeter, at the opposite sides. Over part of each scoop, adjacent to the housing, is preferably placed a baffle 87 so arranged that the downcoming air is given an inward veloctiy, for effective scavenging. Below each baffle 87 the housing 29 is apertured to form a port or ports 88 leading horizontally into the interior. These two inlet arrangements being symmetrical there is a tendency for the incoming air to sweep upwardly and then downwardly to the outlets, the latter being shown as housing wall ports 90 at the front and rear sides, each conducting the air flow outwardly into a discharge flue 91 shaped to constitute an open downward discharge. By these means the sensitive instruments are always exposed to freshly incoming air swept into and through the housing by the scoops at two opposite sides and passing thence outwardly and downwardly at the remaining two opposite sides of the telemeter housing.

A modified and more compact scavenging system is shown in Figs. 8 and 9 wherein, inside the telemeter housing 29 is a horizontal partition 93 meeting a vertical partition 94 to form an interior compartment located to enclose the thermostat bimetal 79 and the humidostat sensitive band 73. It is therefore only necessary to flush the atmosphere in the compartment thus defined. This is readily effected by means of a single inlet scoop 95 in the adjacent vertical wall of the housing and a similar outlet flue 96 in the bottom wall 86, beneath the compartment. Each of these flues or scoops is shown of an advantageous construction, permitting opening outwardly for operation or closing in flush against the telemeter walls for storage or shipment. Thus the scoop 95 is shown as an outwardly inclined wall having a pivot 97 at its lower end where it connects with the housing wall, so that it can be swung inwardly into a vertical closed position against the aperture or port 88 in the housing wall. At its ends the scoop wall 95 is shown as bent into or provided with a sector shaped end wall 98 which moves into and from the compartment as the scoop is closed or opened and which has a narrow interior flange 99 forming a stop and determining the opened position of the scoop. The underneath closable flue wall 96 is similarly provided with hinge 97 and sector end walls 98. When both of these devices are opened, as shown in Fig. 9 the relative downflow of air is diverted by the scoop 95 into the compartment bounded by the walls 93 and 94, through the compartment in contact with the sensitive instruments 73 and 79, and thence downwardly through the outlet port 90 for discharge through the outlet flue 96. The arrows show the manner of air flow.

Heat insulation may be applied to any and all parts of the apparatus as may be desirable, and more especially to the battery box 19 to protect it from the ill effects of frigid temperatures, as indicated in Figs. 2, 4 and 8. In Figs. 1, 2 and 4 the battery box is shown attached immediately below the telemeter housing, whereas in Figs. 8 and 9 the battery box is horizontally alongside of the telemeter, and the transmitter casing below the two of them, this having certain advantages but lacking the symmetrical balance of the first arrangement.

As thus far described the battery is employed only for signal sending purposes and the drive of the telemeter is effected by the gravity motor, or cord and drum, no driving clockwork or springs being necessary. This is an advantage owing to the limitation on the period of the effective drive of a clockwork of small and light construction, the gravity motor hereof affording greater driving power and continuation thereof over longer periods to the improvement of the practical utility of the apparatus. So effective is the disclosed system that it has been found that the gravity motor hereof may be employed to supply the energy for the telemeter and as well the energy for the operation of the transmitter, thus dispensing entirely with the battery.

An embodiment of this kind, without clockwork or battery, is illustrated in Fig. 10 wherein a current generator is substituted for the battery. A combined enclosure is shown, one side 18 of which provides the housing for the telemeter and the other side 19 of which provides the box to contain the generating apparatus, and this enclosure may be insulated, as indicated. This embodiment is illustrated in a simple manner by the showing of a generator or dynamo 101 suitably mounted so that its rotor shaft 102 may be connected by coupling 103 with the high speed shaft 42 of such a gear train as already described. By this arrangement the generator may be driven at sufficient rotary speed to deliver current adequate for the purposes of transmitting radio signals from the ascending apparatus to the ground.

Whether the source of current be a battery or a generator there should be outlet connections and conductors affording the functions of the conventional A-battery and B-battery of a shortwave radio transmitting set. Thus in Fig. 10 the generator is shown as provided with outlet terminals A suitably connected with the generator wiring to deliver a current of, for example 6 volts; while the outlet terminals B are analogously connected to deliver, for example 120 volts. From the B-terminals extend conductors D and E, and from the A-terminals conductors F and G, which may be connected into the circuits of the telemeter and the transmitter as will be described in connection with Fig. 7.

The manner of interconnecting the telemeter unit, the current-source unit and the transmitter unit may be varied, and in Fig. 10 is shown an effective mode of mounting the transmitter 20 below the other units, with the antenna 21 depending therefrom. At the top of the transmitter casing 105 is a laterally extending mounting plate 106, and this is adapted to be attached to a complementary plate 107 at the underside of the enclosure 18—19. The attachment for example may be by means of wing or thumb nuts 108.

On Fig. 10 is shown also, in connection with Fig. 4, a certain extent of wiring diagram, of which the A-conductors F and G and the B-conductors D and E have already been mentioned. Between the wiring elements of the transmitter unit 20 and those of the other units there is preferably provided a disconnectible plug 110, its two parts having three prongs and sockets for three of the conductors, namely E, F and G, which thus detachably pass from the current source through the plug and into the transmitter. The fourth conductor D, at the negative side of the B-terminal, is to be extended back into the telemeter, and joined with the connecting wire 55, already described in connection with Figs. 4 and 7, or otherwise connected with the insulated group of telemeter arms 61, 62 and 63 or the panel 57 on which they are mounted. The plug 110 may have its first section permanently accessibly mounted in the enclosure bottom wall, the conductors E, F and G extending interiorly to it, while the conductor D extends interiorly from the source to the wire 55 already mentioned. The complementary part of the plug is preferably at the free end of a flexible cable, the three strands E, F and G of which extend into the transmitter to form part of the circuit system illustrated in Fig. 7.

The circuits shown in the diagram of Fig. 7 comprise in part those indicated in Fig. 10 carried in the telemeter housing, and otherwise showing an illustrative form of radio circuit, carried in the transmitter and operated from the current source, and adapted to produce oscillating currents of radio frequency, causing broadcasting of the signals by way of the depending antenna 21. As an example the transmitter circuit may be of the same general class as that shown in the patent of Colpitts, No. 1,624,537 of April 12, 1927, the operations being based upon the action of an audion or triode H, which, for radiosonde purposes, is preferably an acorn tube or other midget triode.

Fig. 7 shows certain of the telemeter mechanism, including the time arm 52 and the group of swinging arms 61, 62 and 63, all in contact upon the dial or disk 33 which is under steady rotation and carries the silvered radial and spiral contact lines previously described. The swinging arms are electrically interconnected and this group is electrically connected with the time arm by the wire 55, and the negative conductor D from the B-battery extends to this insulated group of parts including the wire 55. When any of the telemeter arms makes contact with the contact line of the dial this completes the circuit extending from the conductor D, through these arms, and thence to the dial and its shaft and the frame or chassis 27 to which these are grounded. In reciting a ground connection herein it is intended to indicate a grounding only to the frame or chassis of the telemeter.

Referring first to the A-circuit, the conductor F from the negative terminal is shown passing through the detachable plug 110, carrying the same designating letter, and extending to the filament of the audion H, for the heating thereof. From the filament extends a wire J, which is connected to the return wire G of the filament circuit, this passing through the plug and back to the positive A-terminal of the current source. A condenser K may be conventionally interposed in a connection extending between wire F and wire J.

Referring to the B-circuit, the current passing from the source through wire D and wire 55 becomes intermittently grounded to the frame at the ground connection indicated at L, whenever a telemeter arm makes contact with a contact line of the dial. The remainder of this circuit is comprised in the transmitting set. By way of the frame or ground, the current passes into the conductor G, which has a ground connection M for this purpose. Flowing through conductor G the current thence passes through conductor J, and through the filament and across the grid to the plate of the audion, from which the circuit continues through a lead or wire N and thus back to the return conductor E extending to the positive connection of the B-terminal. Interposed between wire N and conductor E is shown a radio frequency choke P. Extending across between conductor E and wire J is a short connection containing a condenser Q.

Thus the A-battery and B-battery circuits have been completely traced, the latter being the output circuit of the oscillation generating system. The balance of the transmitter comprises the input circuit, together with the oscillation circuit coupled electrostatically to both the input and output circuits, the generated oscillations being impressed suitably upon the antenna. These elements are arranged to produce preferably ultra-high-frequency of transmitting oscillation, the frequency depending on the values of the capacitance and inductance in the oscillation circuit, which may be tuned by variable condensers.

Thus there is shown an extension wire R leading from wire N to the oscillating circuit S, the latter containing an inductance adjacent and connected to the antenna 21. From the juncture of conductor G and wire J is shown a wire U extending to the oscillating circuit S; and in said circuit, at each side of the wire U is included a variable condenser V. From the circuit S, at its side opposite to the connection of the antenna, extends a wire W to the grid of the audion. A conventional grid leak or high resistance X is extended across between the wire W and the wire U, while a condenser Y is interposed at a suitable point in the grid lead wire W. Another desirable element, for ultra-high-frequency transmission, is an additional ground connection Z, grounding the wire U which also is grounded through the conductor G to the telemeter frame; and in this use the ground Z may act as a shield, by being arranged close to the terminals of the audion, thus in a known manner stabilizing the oscillation performance of the circuit.

As an illustrative example the entire suspended apparatus, with A and B batteries, may have a weight of four pounds; and the weight, especially if the battery be replaced by a generator, may be reinforced sufficiently to deliver the necessary driving energy. From the drum unwinds the cord 15 of such length as to continue the drive of the telemeter for 90 minutes or longer, affording at the receiving station a series of 360 or more cycles of signals showing the progressive changes in pressure, temperature and humidity. When the generator of Fig. 10 is used in place of a battery, the generator may be either of the alternating current kind, as with single phase, or of the direct current pulsating type. A double voltage output has been indicated, for example with 6 volts and 120 volts respectively, but instead the generator may deliver a single output at 6 volts, and a portion of the energy converted for example to 120 volts by a small step-up transformer. As already stated the transmitter is preferably designed for ultra-high-frequency signalling, as for example on a 5-meter wave length. With certain types of generator, the action thereof may afford a predetermined steady speed of rotation, acting as a governor, and in such case the centrifugal device 44 may be dispensed with. However this mechanical type of speed control is found to be of advantage since it can be arranged to cause a rapid slight vibration of the telemeter frame which, communicated to the dial, functions to promote free travel of the telemeter arms or their tips $p$, $t$ and $h$ over the dial and across the spiral contact line, smoothly and without jerks, to the material improvement of accuracy.

Other matters involved include the following. Each sounding operation may terminate with the bursting of the balloon, in a known way, at a predetermined altitude, the parachute opening at once for the descent. For reception of signals, recorders are known which afford a complete record of the flight. In the telemeter the temperature arm 62 may swing toward the center with ascent and temperature drop, and its tracing on the dial and at the recorder will vary correspondingly. The humidity arm 63 may swing toward the peripheral margin with ascent and humidity drop. The pressure arm 61 may swing from the center with ascent and pressure drop. The temperature arm thus swings oppositely to the other two arms, and its tracing may overlap or intersect those of the others, but without impairing the value of the record since the respective tracings are readily identified and followed on the record.

What is claimed is:

1. In a balloon-elevated radiometeorograph, in combination, a suspension cord below the balloon, a telemeter, a suspended housing closed at top and sides and enclosing the telemeter, and for driving the telemeter a gravity motor comprising a drum from which said cord unwinds by the relative descent of the telemeter, and a radio-signal transmitter operated by the telemeter; the suspended housing enclosing the telemeter having at the top wall thereof an exit guide for the relatively ascending drive cord, comprising a rubbery nipple member through which the cord slides and which excludes entrance of water from the cord into the telemeter.

2. In a balloon-elevated radiometeorograph having a telemeter operating a radio-signal transmitter, a suspension cord between the balloon and telemeter, a suspended housing having roof and side walls protectively enclosing the telemeter, and for driving the telemeter a gravity motor comprising a drum from which said cord unwinds by the relative descent of the housed telemeter, the suspended housing having its roof wall formed with an aperture near its middle, and an exit guide occupying said aperture through which guide the relatively ascending drive cord can slide upwardly, said exit guide comprising resilient means snugly engaging the cord and permitting relative upward travel thereof while diverting and shedding any water creeping down the cord thereby to exclude the entrance of water into the housing, keeping dry the cord within the housing and protecting the telemeter from wetting.

3. The combination as in claim 2 and wherein the resilient guide means comprises a rubbery nipple with a small perforation for the passage of the cord.

4. The combination as in claim 2 and wherein the resilient guide means comprises a rubbery nipple upstanding above the roof wall with a small perforation at its top end for the passage of the cord with tight fit therethrough.

5. In a balloon-elevated radiometeorograph having a telemeter operating a radio-signal transmitter, a suspension cord between the balloon and telemeter, a suspended housing having top and side walls protectively enclosing the telemeter, and for driving the telemeter a gravity motor actuated by the relative travel of said cord during the relative descent of the housed telemeter, the suspended housing having near the middle of its top wall an exit guide through which the relatively ascending cord can slide upwardly, said exit guide comprising yielding means engaging and tightly hugging the cord and permitting relative upward travel thereof while exteriorly diverting any water creeping down the cord thereby to exclude the entrance of water into the housing.

6. A radiometeorograph of the kind having a radio signal transmitter in circuit with a controlling telemeter mechanism, said mechanism comprising a frame, a rotary dial mounted on and grounded to the frame, and means for driving steadily a set of arms representing weather factors each contacting shiftably upon said dial to create signals representing the weather factors; means electrically connecting and grouping all of said arms, and mountings electrically insulating the group from said frame; the circuit of the signal transmitter extending through said group of arms, the dial and the frame; the dial driving means comprising a gravity motor having a cord wound on drum, with the drum shaft driving the dial; a multiplying gear train turned by the motor drum, and a governor at the fast end of the train adapted to effect steady speed of drive and being of the centrifugal type thereby to produce a slight vibration of frame and dial whereby to counteract friction and facilitate the shift of the shiftable arms over the face of the dial.

EUGENE L. SCHELLENS.
NORMAN E. GIBBS.